United States Patent
Grover et al.

(10) Patent No.: US 8,861,695 B2
(45) Date of Patent: Oct. 14, 2014

(54) SYSTEM AND METHOD FOR SENDING DATA USING CALLER ID

(75) Inventors: Douglas M. Grover, Westminster, CO (US); Paul Roller Michaelis, Louisville, CO (US)

(73) Assignee: Avaya Inc., Basking Ridge, NJ (US)

(*) Notice: Subject to any disclaimer, the term of this patent is extended or adjusted under 35 U.S.C. 154(b) by 1150 days.

(21) Appl. No.: 12/467,822

(22) Filed: May 18, 2009

(65) Prior Publication Data

US 2010/0290608 A1 Nov. 18, 2010

(51) Int. Cl.
- *H04M 1/56* (2006.01)
- *H04M 1/725* (2006.01)
- *H04M 3/42* (2006.01)
- *H04M 3/51* (2006.01)

(52) U.S. Cl.
CPC .............. *H04M 1/72572* (2013.01); *H04N 1/57* (2013.01); *H04M 3/42347* (2013.01); *H04M 2207/206* (2013.01); *H04M 3/42042* (2013.01); *H04M 2242/30* (2013.01); *H04M 3/5116* (2013.01)
USPC ...... 379/142.04; 370/352; 370/389; 370/401; 379/21; 379/88.11; 379/142.01; 379/201.01; 379/373.01; 455/403; 455/414.1; 455/432.2; 455/445; 455/466; 700/293; 709/230; 709/236; 709/238

(58) Field of Classification Search
CPC ...................................................... H04M 3/5116
USPC ......... 379/45, 88.19, 142.01, 142.04, 142.17, 379/201.05, 202.01, 93.17, 142.02, 211.01, 379/372, 27.01, 142.06, 373.01, 21, 37, 48, 379/88.11, 215.01, 382; 455/415, 403, 445, 455/404.2, 417, 414.1, 414.4, 432.2, 466; 709/230, 238, 236; 370/352, 389, 401; 700/293
See application file for complete search history.

(56) References Cited

U.S. PATENT DOCUMENTS

| | | | |
|---|---|---|---|
| 4,582,956 A | 4/1986 | Doughty | |
| 5,550,900 A | 8/1996 | Ensor et al. | |
| 5,937,038 A * | 8/1999 | Bell et al. | 379/93.17 |

(Continued)

FOREIGN PATENT DOCUMENTS

EP   1473947 B1   7/2007

OTHER PUBLICATIONS

SBC Corporation, "Ameritech's Caller ID, Caller ID With Name and Visual Message Waiting Indicator," SBC Practice, Publication No. AM-TR-NIS-000099, Issue 3, Aug. 1993, pp. i, ii, and 1-6.

(Continued)

*Primary Examiner* — Gerald Gauthier
(74) *Attorney, Agent, or Firm* — Sheridan Ross P.C.

(57) ABSTRACT

A communication system receives data that does not pertain to an attempted initial establishment of a communication. The communication system uses a new message format under an existing analog Caller ID standard. The communication system inserts the data (which can be in addition to existing Caller ID data) into a Caller ID message that uses the new message format. The communication system then sends the Caller ID message to a communication device/Private Branch Exchange (PBX)/contact center that can interpret the new message format. The communication device/PBX/contact center can use the data to further route the communication to a specific telephone and/or can use the data to display information such as Global Positioning System (GPS) coordinates of a cell phone. The data can enhance the capabilities of devices and systems that currently work under the Public Switched Telephone Network (PSTN).

25 Claims, 4 Drawing Sheets

(56) References Cited

U.S. PATENT DOCUMENTS

| | | | |
|---|---|---|---|
| 5,974,130 A * | 10/1999 | Sadri et al. | 379/211.01 |
| 5,995,611 A * | 11/1999 | Mowafy et al. | 379/215.01 |
| 6,014,560 A * | 1/2000 | Kramer | 455/414.4 |
| 6,052,592 A * | 4/2000 | Schellinger et al. | 455/445 |
| 6,285,879 B1 | 9/2001 | Lechner et al. | |
| 6,324,263 B1 | 11/2001 | Sherwood et al. | |
| 6,351,648 B1 | 2/2002 | Karapetkov et al. | |
| 6,404,868 B1 * | 6/2002 | Beamish et al. | 379/142.01 |
| 6,463,138 B1 * | 10/2002 | Sherwood et al. | 379/142.14 |
| 6,683,948 B1 * | 1/2004 | Hsieh | 379/372 |
| 6,687,574 B2 | 2/2004 | Pietrowicz et al. | 700/293 |
| 6,920,211 B2 * | 7/2005 | Pelletier et al. | 379/201.05 |
| 6,978,313 B1 * | 12/2005 | Pietrowicz | 709/238 |
| 7,123,692 B2 * | 10/2006 | Atkinson et al. | 379/21 |
| 7,215,751 B2 * | 5/2007 | Creamer et al. | 379/142.06 |
| 7,260,197 B2 * | 8/2007 | Smith | 379/142.06 |
| 7,269,413 B2 * | 9/2007 | Kraft | 455/415 |
| 7,283,625 B2 * | 10/2007 | Urban et al. | 379/142.04 |
| 7,403,604 B2 * | 7/2008 | Mundra et al. | 379/142.02 |
| 7,418,096 B2 * | 8/2008 | Moton et al. | 379/373.01 |
| 7,564,960 B2 * | 7/2009 | Urban et al. | 379/142.01 |
| 7,743,164 B2 * | 6/2010 | Coldren | 709/236 |
| 7,844,035 B2 * | 11/2010 | Pietrowicz | 379/48 |
| 7,852,831 B2 * | 12/2010 | Akbar | 370/352 |
| 7,881,447 B1 * | 2/2011 | Satapathy et al. | 379/202.01 |
| 7,978,833 B2 * | 7/2011 | Urban et al. | 379/142.04 |
| 8,019,317 B2 * | 9/2011 | Litwin | 455/403 |
| 8,073,121 B2 * | 12/2011 | Urban et al. | 379/142.01 |
| 8,126,439 B1 * | 2/2012 | Sankaranaraynan et al. | 455/414.1 |
| 8,160,222 B2 * | 4/2012 | White et al. | 379/142.17 |
| 8,275,371 B2 * | 9/2012 | Tischer et al. | 455/432.2 |
| 8,290,470 B2 * | 10/2012 | Ray et al. | 455/404.2 |
| 2003/0215070 A1 * | 11/2003 | Akhteruzzaman et al. | 379/88.19 |
| 2004/0096042 A1 * | 5/2004 | Orwick et al. | 379/45 |
| 2004/0203556 A1 * | 10/2004 | Litwin | 455/403 |
| 2005/0105540 A1 * | 5/2005 | Baumann et al. | 370/401 |
| 2005/0190756 A1 * | 9/2005 | Mundra et al. | 370/389 |
| 2006/0072548 A1 * | 4/2006 | Mundra et al. | 370/352 |
| 2007/0189481 A1 * | 8/2007 | Cadiz et al. | 379/142.04 |
| 2008/0123670 A1 * | 5/2008 | Mundra et al. | 370/401 |
| 2008/0144779 A1 * | 6/2008 | Ray et al. | 379/45 |
| 2008/0159505 A1 * | 7/2008 | Mundra et al. | 379/201.01 |
| 2008/0162710 A1 * | 7/2008 | Mundra et al. | 709/230 |
| 2008/0212744 A1 * | 9/2008 | Wurst et al. | 379/27.01 |
| 2009/0215427 A1 * | 8/2009 | Hawkins | 455/404.2 |
| 2009/0290699 A1 * | 11/2009 | Nassimi | 379/142.17 |
| 2010/0054427 A1 * | 3/2010 | Luneau | 379/48 |
| 2010/0234004 A1 * | 9/2010 | Sweeney et al. | 455/415 |
| 2010/0267374 A1 * | 10/2010 | Armstrong et al. | 455/417 |
| 2010/0290608 A1 * | 11/2010 | Grover et al. | 379/142.04 |

OTHER PUBLICATIONS

Info-Communications Development Authority of Singapore, Equipment and Cabling Regulation Department, "Specification for Analogue Calling Line Identity Presentation Facility for connection to Public Switched Telephone Network (PSTN)," Issue 1, Rev 1, Dec. 1, 1999, Publication No. IDA TS PSTN 1 A-CLIP, pp. 1-9.

* cited by examiner

SYSTEM AND METHOD FOR SENDING DATA USING CALLER ID

TECHNICAL FIELD

The system and method relates to Caller ID systems and in particular to sending data using Caller ID systems and methods.

BACKGROUND

Caller ID standards using analog facilities are used in a variety of countries, including the United States. Examples of analog Caller ID standards include, but are not limited to the following: IDA TS PSTN 1-A, GR-127-CORE, Telecordia GR-30, TIA/EIA-777, and GR-30-CORE. As analog Caller ID standards evolved, so did the rules which defined the capabilities of Caller ID. In the United States, the Federal Communications Commission (FCC) regulates the information that can be sent using analog Caller ID. Currently, this information is limited to information pertaining to the initial establishment of a call. A reason for this FCC regulation is that toll charges on the Public Switched Telephone Network (PSTN) are not incurred until the called party answers the incoming call. The regulation therefore imposes limits on the information that can be passed to the called party for free.

Analog Caller ID standards that are defined for the PSTN send information associated with the initial establishment of a communication such as the caller's telephone number, the time of the call, the date of the call, the caller's name, and call waiting information. The analog Caller ID standards also include parameters for message waiting. Like the other analog Caller ID messages/parameters, message waiting information relates to a prior attempt to establish the communication (i.e. a message was left after the attempted call was made). Other information such as test information to determine if the initial establishment of a call can be accomplished can also be sent under current analog Caller ID standards.

As a result, information not pertaining to attempts to initially establish a communication is not sent using analog Caller ID standards. This limits the capability of systems that rely on PSTN and analog Caller ID to only use the information that is currently available using analog Caller ID. For example, U.S. Pat. No. 6,324,263 discloses a system that routes a communication based on the telephone number of the caller by looking up the caller's telephone number in a routing table. If there is a match, then the call is routed to the extension or telephone number in the routing table.

The use of a database look-up, to match the Caller ID to other important information, is well known in the prior art. For example, it is common practice for 9-1-1 Public Safety Access Points (PSAPs) to map the Caller ID information to vital information that is maintained in the PSAP database, notably the street address associated with the telephone number, directions to that location, and the local availability of resources, such as fire hydrants. This PSAP application illustrates an important problem with the current Caller ID implementation: The mapping of Caller ID to a specific location is reliable only for PSTN land lines. It does not work for mobile devices, such as cellular telephones and Voice over Internet Protocol (VOIP) telephones (e.g. a VOIP soft phone on a mobile personal computer) that can register to the PSTN with the same phone number from different locations. There is a need for an analog Caller ID protocol that solves this problem, while staying within the scope and objectives of the FCC rules.

SUMMARY

The system and method are directed to solving these and other problems and disadvantages of the prior art. A communication system receives data that does not pertain to an attempted initial establishment of a communication. The communication system uses a new message format under an existing analog Caller ID standard. The communication system inserts the data (which can be in addition to existing Caller ID data) into a Caller ID message that uses the new message format. The communication system then sends the Caller ID message to a communication device/Private Branch Exchange (PBX)/contact center that can interpret the new message format.

The communication device/PBX/contact center can use the data to further route the communication to a specific telephone and/or can use the data to display information such as Global Positioning System (GPS) coordinates of a cell phone. The data can enhance the capabilities of devices and systems that currently work under the Public Switched Telephone Network (PSTN).

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
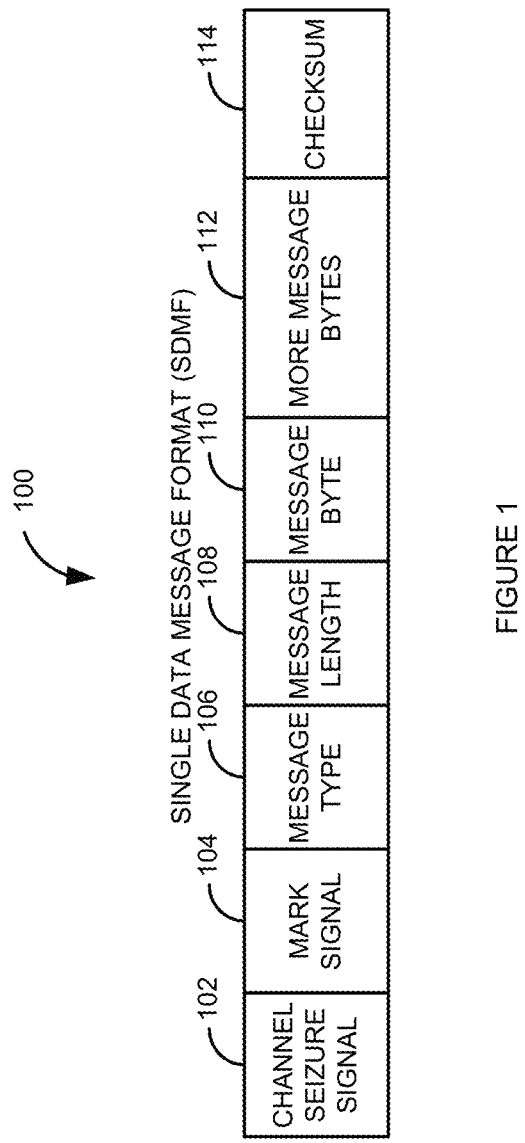
FIG. 1 is a block diagram of Single Data Message Format Caller ID message.

FIG. 1 is a block diagram of Single Data Message Format (SDMF) Caller ID message 100. Under analog Caller ID standards, Caller ID messages are sent between ringing signals. U.S. Pat. No. 4,582,956, which is incorporated herein by reference, discloses a system for sending messages between ringing signals at the physical level. Publication IDA TS PSTN 1 A-CLIP, Issue 1 Rev 1, which is incorporated herein by reference, discloses messages sent under an analog Caller ID standard. Publication TIA/EIA-PN-4078, which is incorporated herein by reference, discloses the various message formats used in analog Caller ID. One of the analog Caller ID formats is the Signal Data Message Format (SDMF). An SDMF message 100 comprises a channel seizure signal 102, a mark signal 104, a message type 106, a message length 108, a message byte 110, more message bytes 112, and a checksum 114.

The SDMF message 100 is sent asynchronously. The channel seizure signal 102 is typically a string of 300 continuous bits of alternating "0"s and "1"s. The mark signal 104 is 180 continuous "1"s. The channel seizure 102 and the mark signal are used to identify the beginning of the SDMF message 100. The message type 106 is used to identify the type of message being sent. A SDMF message type 106 is identified by the following values (in hexadecimal): 1) 0x04—SDMF packet header, 2) 0x06—SMDF Message waiting indicator, 3) 0x0B SMDF (Reserved, Message Desk Information). The message length 108 is the length of the message (of fields 110 and 112). The message byte 110 and more message bytes 112 fields contain the Caller ID message. The Caller ID message will typically include the date, hour, minute of the call, and the caller's number. The messages in SDMF are all tied to the initial establishment of a communication. For example, the date, hour, and minute of the call are associated with the time of an attempt to establish a communication with the called number. The caller number is associated to who is attempting to establish the communication.

Figure 2:
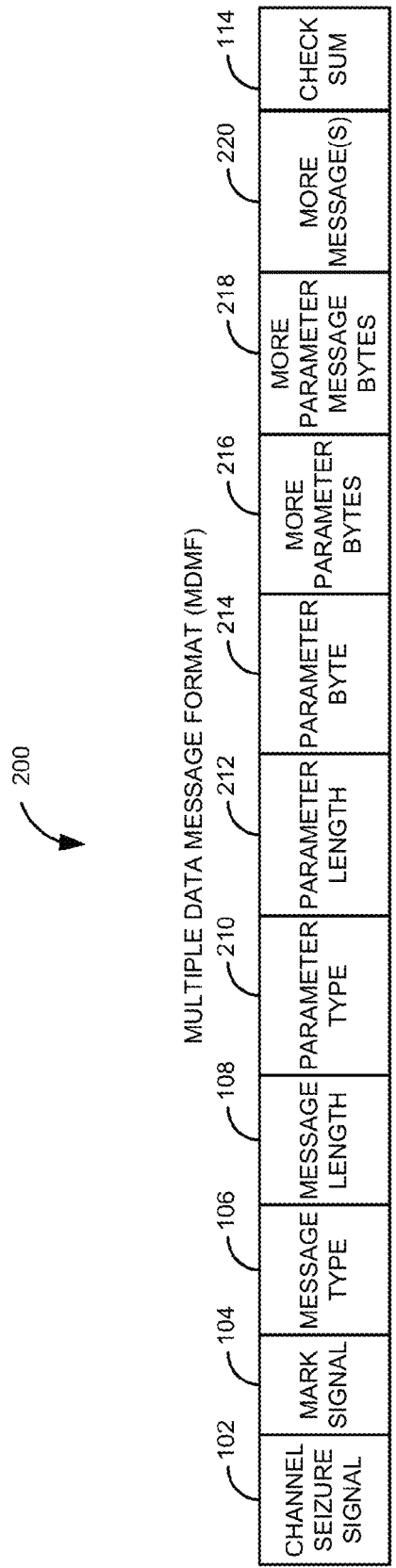
FIG. 2 is a block diagram of a Multiple Data Message Format Caller ID message.

FIG. 2 is a block diagram of a Multiple Data Message Format (MDMF) Caller ID message 200. Like the SDMF message, an MDMF message is sent asynchronously. An MDMF message 200 comprises the channel seizure signal 102, the mark signal 104, the message type 106, the message length 108, a parameter type 210, a parameter length 212, a parameter byte 214, more parameter bytes 216, more parameter message bytes 218, more messages 220, and the checksum 114. An MDMF message type 106 is identified by the following values: 1) 0x80—MDMF packet header, 2) 0x81—MDMF test sequence packet header, and 3) 0x80—MDMF message waiting notification. The parameter type 210 defines the following values: 1) 0x01—Time, 2) 0x02—Calling Line Identification, 3) 0x03—Dialable Directory Number, 4) 0x04—Reason for Absence of Dialable Directory Number, 5) 0x05—Reason for Redirection (reserved), 6) 0x06—Call Qualifier, 7) 0x07—Calling Name, 8) 0x08—Reason for Absence of Calling Name, and 9) 0x0B—(Visual) Message Waiting Indicator.

The time parameter identifies the time of the call. The calling line identification parameter identifies the caller's number. The dialable directory number parameter is the exact number that needs to be dialed to reach the caller. The absence of dialable directory parameter is an indication of why no dialable directory number is present in the MDMF message 200. The reason for redirection parameter is reserved and not defined. The call qualifier parameter indicates that the incoming call is a toll call. The calling name parameter contains the name of the caller. The reason for absence of calling name indicates why no calling name parameter was sent. The message waiting indicator indicates if there is a call message waiting from a previously attempted call. Like messages in the SDMF format, the MDMF format parameters are associated with an attempt to establish a communication. For example, the message waiting indicator is associated with a previous attempt to establish a communication. The time, calling line indication, dialable director number, call qualifier, and calling name are also associated with an attempt to establish a new communication.

Figure 3:
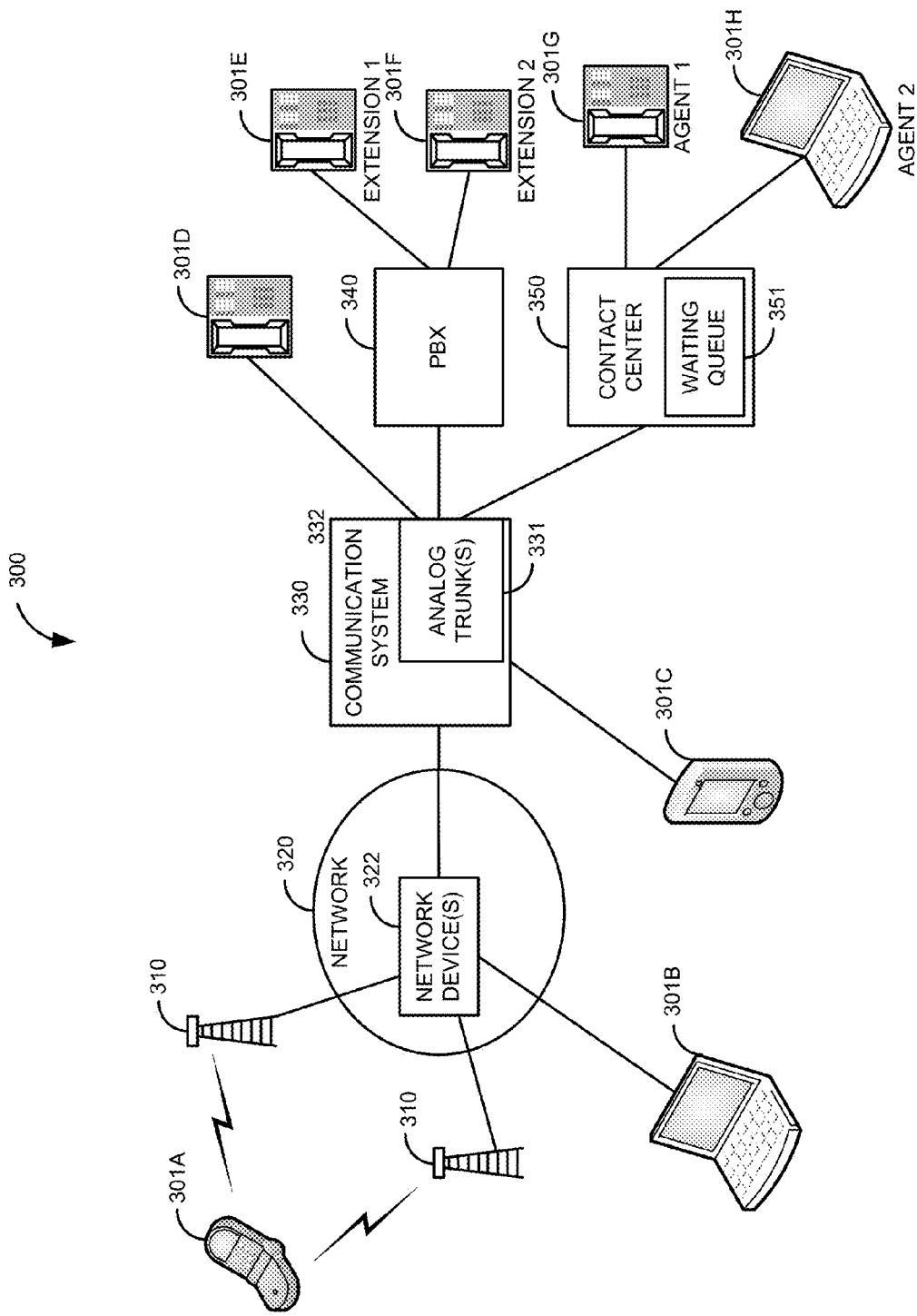
FIG. 3 is a block diagram of a first illustrative system for sending data using an analog Caller ID standard.

FIG. 3 is a block diagram of a first illustrative system 300 for sending data using an analog Caller ID standard. The first illustrative system 300 can be one of many typical network systems that can be used. The first illustrative system 300 comprises communication devices 301, base stations 310, a network 320, network device(s) 322, communication system(s) 330, a Private Branch Exchange (PBX) 340, and a contact center 350. The communication system 330 communicates to communication device 301D, the PBX 340, and the contact center 350 via analog trunks 331.

A communication device 301 can be any type of device that can send data including, but not limited to, a telephone 301D-301G, a cellular telephone 301A, a Personal Digital Assistant (PDA) 301C, a Personal Computer (PC) (301B and 301H), a PC with a VOIP soft phone, a VOIP phone, a PBX 340, a contact center 350, and the like. The base stations 310 can be any device capable of communicating with wireless communication devices 301 such as a cellular telephone 301A. The network devices 322 may be any device capable of sending information in a network 320 such as a central office switch, a PBX 340, a router, a server, and the like. The network 320 may be any type of network such as the Internet, a Local Area Network (LAN), a Wide Area Network (WAN), and the like.

The communication system 330 may be any device capable of receiving and sending communication data such as a PBX 340, a central office switch, a router, a server, and the like. The communication system 330 contains analog trunks 331 that send Caller ID information. The communication system 330 may be part of the network 320. The communication system 330 has analog trunks 331 that can communicate to a variety of devices including, but not limited to, communication device 301D, the PBX 340, and the contact center 350. The PBX 340 may be any device capable of supporting calls from analog trunks 331 and routing calls to one or more communication devices 301E-301F. The contact center 350 may be any device capable of receiving calls from analog trunks 331 and routing calls to one or more agents at communication devices 301G-301H. The contact center 350 can contain a waiting queue 351 that is used to place a caller on hold until an available agent is ready to service the caller's communication.

The communication system 330 receives data that is not associated with an attempted initial establishment of a communication. A communication can be any type of communication that can be established using analog communications. For example, a communication can be a voice call, a FAX communication, a data communication (i.e. via a modem), and the like. An attempt to initially establish a communication begins when a user/communication device 301 initiates the communication. An initial communication is when the communication is first established with a device. For example, if a user on cell phone 301A places a call to contact center 350 (initial attempt) and a communication is established with the contact center 350, the initial communication is between the cellular telephone 301A and the contact center 350. After the initial communication with the contact center, the communication may later be connected to, for example, Agent 1 at telephone 301G after the call was placed in a waiting queue 351 in the contact center 350.

Examples of data not associated with the attempted initial establishment of a communication can include, but are not limited to, Global Positioning System (GPS) coordinates of a communication device 301, location coordinates of a communication device 301, an emotional state of a caller, a promotional code, a frequent flyer number, an account number, a credit card number, and the like. Instead of being associated with the initial establishment of the communication, this type of data is typically used after the communication is established. Other types of data not associated with an attempted initial establishment of a communication can include a routing code and/or an extension number. A routing code/extension number is not associated with the initial establishment of a communication because the routing code/extension numbers are not required in the attempt to establish the communication (neither is the ID of the caller).

The communication system 330 uses a new message format under an analog Caller ID standard. Some examples of Caller ID standards include IDA TS PSTN 1-A, GR-127-CORE, Telecordia GR-30, TIA/EIA-777, GR-30-CORE, and the like. A new message format can be a new message type 106. For example, the communication system 330 can define a message type 106 of 0xFF with new parameter fields like those used in the MDMF format to identify the specific type of data being sent (e.g. parameter 0x01H for GPS coordinates). The communication system 330 can be a completely new protocol using the Caller ID physical layer standard and completely ignore the existing Caller ID message types 106 for SDMF and MDMF. This will work as long as the receiving communication device 301 or system (e.g. PBX 340 or contact center 350) can interpret the new message format. The communication system 330 can define a new parameter type 210 under the MDMF format. For example, under existing Caller ID MDMF, a parameter type 210 of 0x08 could indicate an extension number, 0x81 could indicate an emotional state of the caller, and the like.

The communication system 330 inserts the received data that is not associated with an attempted initial establishment of a communication into a Caller ID message. The communication system 330 then sends the Caller ID message to a communication device 301 that can interpret the new message format (e.g. communication device 301D, the PBX 340, and/or the contact center 350).

To illustrate how the first illustrative system 300 would work, consider the following example. A user of cell phone 301A makes an initial "911" call to the contact center 350. Prior to initiating the call, cell phone 301A gets its Global Positioning (GPS) coordinates. Another option would be where during initiation of the call, network device 322 gets the cell phone's coordinates by triangulation of the base stations 310. The GPS coordinates/triangulation coordinates, the cell phone's telephone number, and the caller's name are sent to communication system 330. The GPS coordinates/triangulation coordinates can be sent in various ways such as in packets, by time division multiplexed means, and the like. The communication system 330 receives the GPS coordinates/triangulation coordinates, the cell phone's telephone number, and the caller's name.

The communication system 330 has defined a new parameter type under MDMF. The communication system 330 inserts the GPS coordinates/triangulation coordinates (using a new MDMF parameter type 210) along with the traditional caller ID data using defined MDMF parameters (0x01 time, 0x02 caller number, 0x07 caller name) into the MDMF Caller ID message 200. The contact center 350 receives the GPS coordinates/triangulation coordinates, the Caller ID data, and the caller's name. After the attempted initial establishment of the call with the contact center 350, the contact center 350 routes the call to communication device 301G (agent 2). The GPS coordinates/triangulation coordinates, the cell telephone's number, and the caller's name are displayed to Agent 2. Agent 2 can now send help to the GPS coordinates/triangulation coordinates.

Other examples of using GPS coordinates could be where someone is calling a travel agent from an airport. The GPS coordinates of the airport could be directed to the travel agent to allow the travel agent to better handle the call; for example, by looking up current flights (based on an itinerary) from the airport prior to establishing the call.

As another example, a Personal Digital Assistant (PDA) 301C can send routing information (e.g. which one of its extensions to route the call to). PBX 340 receives an initial request for a call from PDA 301C in which the Caller ID message 200 contains routing information using a new message type 106; after the communication is established, the PBX 340 can then route the call to a specific extension 301E or 301F based on the routing information.

Figure 4:
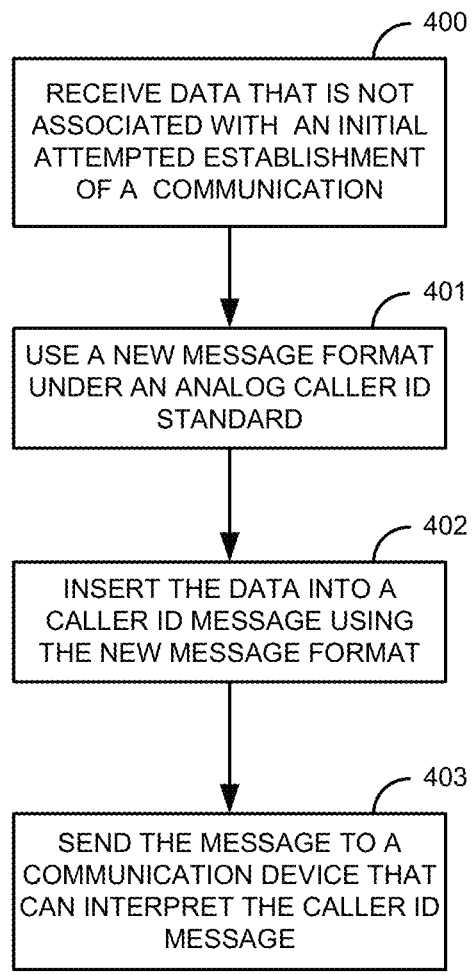
FIG. 4 is a flow diagram of a method for sending data using an analog Caller ID standard.

FIG. 4 is a flow diagram of a method for sending data using an analog Caller ID standard. Illustratively, the communication devices 301, the network device(s) 322, the communication system 330, the PBX 340, and the contact center 350 are stored-program-controlled entities, such as a computer, which perform the method of FIG. 4 by executing a program stored in a storage medium, such as a memory or disk.

The communication system 330 receives 400 data that is not associated with an attempted initial establishment of a communication. The communication system 330 uses 401 a new message format under an analog Caller ID standard. The communication system 330 inserts 402 the data that is not associated with the attempted initial establishment of the communication into a Caller ID message using the new message format. The communication system 330 sends 403 the Caller ID message to a communication device (301, 340, and 350) that can interpret the new message format in the message.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising:
a communication system configured to receive data conforming to an existing message format described by an existing Caller ID standard;
to receive data that is not associated with an attempted initial establishment of a communication;
to insert the data into an analog Caller ID message using a message format that conforms to the existing analog Caller ID standard, that is different than the existing message format, and that comprises at least one of an other message type and an other parameter type; and
to send the analog Caller ID message to a non-analog communication device that can interpret the message format.

2. The system of claim 1, wherein the message format defines the other message type.

3. The system of claim 1, wherein the message format is not based on a Single Data Message Format (SDMF) or a Multiple Data Message Format (MDMF).

4. The system of claim 1, wherein the message format defines the other parameter type under Multiple Data Message Format (MDMF).

5. The system of claim 1, wherein the message format defines the other message type and the other parameter type under Multiple Data Message Format (MDMF).

6. The system of claim 5, wherein the sent analog Caller ID message further comprises defined messages within the existing analog Caller ID standard.

7. The system of claim 1, wherein the existing analog Caller ID standard is at least one of the following: IDA TS PSTN 1-A, GR-127-CORE, Telecordia GR-30, TIA/EIA-777, and GR-30-CORE.

8. The system of claim 1, further comprising a second communication device or a network device connected to the second communication device configured to get the data and send the data to the communication system.

9. The system of claim 8, wherein the second communication device is a mobile communication device and the data comprises positioning coordinates of the mobile communication device.

10. The system of claim 8, wherein the data contains routing information.

11. The system of claim 8, wherein the data is at least one of the following: an emotional state of a caller, a promotional code, a frequent flyer number, an account number, and a credit card number.

12. The system of claim 1, wherein the data is not used prior to the establishment of the initial communication.

13. A method comprising:
   a. receiving, in a communication system, data conforming to an existing message format described by an existing Caller ID standard and the data is not associated with an attempted initial establishment of a communication;
   b. inserting, in the communication system, the data into an analog Caller ID message using a message format that conforms to the existing analog Caller ID standard, that is different than the existing message format, and that comprises at least one of an other message type or an other parameter type; and
   c. sending, from the communication system, the analog Caller ID message to a non-analog communication device that can interpret the message format.

14. The method of claim 13, wherein the message format defines the other message type.

15. The method of claim 13, wherein the message format is not based on a Single Data Message Format (SDMF) or a Multiple Data Message Format (MDMF).

16. The method of claim 13, wherein the message format defines the other parameter type under Multiple Data Message Format (MDMF).

17. The method of claim 13, wherein the message format defines the other message type and the second parameter type under Multiple Data Message Format (MDMF).

18. The method of claim 17, wherein the sent analog Caller ID message further comprises defined messages within the existing analog Caller ID standard.

19. The method of claim 13, wherein the existing analog Caller ID standard is one of the following: IDA TS PSTN 1-A, GR-127CORE, Telecordia GR-30, TIA/EIA-777, and GR-30-CORE.

20. The method of claim 13, further comprising the steps of:
   e. getting the data in a second communication device or from a network device connected to the second communication device; and
   f. sending the data from the second communication device or the network device to the communication system.

21. The method of claim 20, where the second communication device is a mobile communication device and the data comprises positioning coordinates of the mobile communication device.

22. The method of claim 20, wherein the data contains routing information.

23. The method of claim 20, wherein the data is at least one of the following: an emotional state of a caller, a promotional code, a frequent flyer number, an account number, and a credit card number.

24. The system of claim 13, wherein the data is not used prior to the establishment of the initial communication.

25. An apparatus comprising:
   a. means for receiving, in a communication system, data conforming to an existing message format described by an existing Caller ID standard, the data not being associated with an attempted initial establishment of a communication;
   b. means for inserting, in the communication system, the data into an analog Caller ID message using a message format that conforms to the existing analog Caller ID standard, that is different than the existing message format, and that comprises at least one of an other message type or an other parameter type; and
   c. means for sending, from the communication system, the analog Caller ID message to a non-analog communication device that can interpret the message format.

* * * * *